US012594561B2

(12) United States Patent
Örtegren

(10) Patent No.: US 12,594,561 B2
(45) Date of Patent: Apr. 7, 2026

(54) MODULAR CENTRIFUGAL SEPARATOR FOR CLEANING GAS

(71) Applicant: Alfdex AB, Landskrona (SE)

(72) Inventor: Anders Örtegren, Landskrona (SE)

(73) Assignee: ALFDEX AB, Landskrona (SE)

( * ) Notice: Subject to any disclaimer, the term of this patent is extended or adjusted under 35 U.S.C. 154(b) by 278 days.

(21) Appl. No.: 18/280,433

(22) PCT Filed: Feb. 18, 2022

(86) PCT No.: PCT/EP2022/054034
§ 371 (c)(1),
(2) Date: Sep. 5, 2023

(87) PCT Pub. No.: WO2022/194486
PCT Pub. Date: Sep. 22, 2022

(65) Prior Publication Data

US 2024/0149278 A1 May 9, 2024

(30) Foreign Application Priority Data

Mar. 17, 2021 (EP) .................................... 21163141

(51) Int. Cl.
*B04B 5/08* (2006.01)
*B04B 5/12* (2006.01)
(Continued)

(52) U.S. Cl.
CPC .................. *B04B 5/08* (2013.01); *B04B 5/12* (2013.01); *B04B 7/02* (2013.01); *B04B 9/02* (2013.01);
(Continued)

(58) Field of Classification Search
CPC .... B04B 5/08; B04B 5/12; B04B 7/02; B04B 9/02; B04B 9/06; B04B 11/02;
(Continued)

(56) References Cited

U.S. PATENT DOCUMENTS 3,234,716 A * 2/1966 Sevin ........................ B04B 5/12 209/714
3,482,771 A * 12/1969 Thyefors .................. B04B 1/18 494/71
(Continued)

FOREIGN PATENT DOCUMENTS

CN 102470378 A 5/2012
CN 106232238 A 12/2016
(Continued)

OTHER PUBLICATIONS

Alfa Laval, "Flex separation systems, S-separators 928-988", retrieved Jul. 18, 2023.
(Continued)

*Primary Examiner* — Dung H Bui
(74) *Attorney, Agent, or Firm* — Birch, Stewart, Kolasch & Birch, LLP

(57) ABSTRACT

A centrifugal separator for cleaning gas containing contaminants includes a stationary casing module including a surrounding side wall enclosing a separation space through which a gas flow is permitted, a gas outlet for cleaned gas, and at least one drainage opening for draining separated liquid contaminants from a lower portion of the stationary casing module; a rotating module including a plurality of separation members arranged in said separation space and being arranged to rotate around an axis of rotation; a drive member arranged for rotating the rotating module around the axis of rotation; and an inlet module arranged axially above the stationary casing module, including an inlet pipe for supply of the gas to be cleaned to the inlet module. The inlet module is in fluid contact with the separation space and a liquid outlet module arranged axially below the stationary casing module and configured to permit discharge of liquid contaminants drained from the stationary casing module. The liquid outlet module includes a lower base portion and
(Continued)

at least one upwardly extending portion from the lower base portion. The at least one upwardly extending portion extends axially along the surrounding side wall of the stationary casing module such that the liquid outlet module forms an open container into which the stationary casing module is arranged. The liquid outlet module is attached to the stationary casing module via the at least one upwardly extending portion.

19 Claims, 4 Drawing Sheets

(51) Int. Cl.

| | |
|---|---|
| ***B04B 7/02*** | (2006.01) |
| ***B04B 9/02*** | (2006.01) |
| ***B04B 9/06*** | (2006.01) |
| ***B04B 11/02*** | (2006.01) |
| ***B04B 11/06*** | (2006.01) |
| ***F01M 13/04*** | (2006.01) |

(52) U.S. Cl.
CPC ................ *B04B 9/06* (2013.01); *B04B 11/02* (2013.01); *B04B 11/06* (2013.01); *F01M 13/04* (2013.01); *B04B 2005/125* (2013.01); *F01M 2013/0422* (2013.01)

(58) Field of Classification Search
CPC ... B04B 11/06; B04B 2005/125; F01M 13/04; F01M 2013/0422
See application file for complete search history.

(56) References Cited

U.S. PATENT DOCUMENTS

| | | | | |
|---|---|---|---|---|
| 6,925,993 | B1 * | 8/2005 | Eliasson ................ | B01D 45/16 123/572 |
| 8,043,201 | B2 | 10/2011 | Baumann | |
| 8,171,920 | B2 | 5/2012 | Inge et al. | |
| 8,657,908 | B2 | 2/2014 | Eliasson | |
| 8,714,132 | B2 | 5/2014 | Baumann et al. | |
| 9,074,558 | B2 | 7/2015 | Roelver | |
| 10,792,992 | B2 | 10/2020 | DeLizo et al. | |
| 2006/0142135 | A1 * | 6/2006 | Hallgren ................ | B01D 45/14 494/24 |
| 2007/0249479 | A1 * | 10/2007 | Eliasson ................ | B01D 45/14 494/83 |
| 2008/0296212 | A1 * | 12/2008 | Baumann .................. | B04B 9/12 210/512.3 |
| 2008/0315692 | A1 * | 12/2008 | Beetz ..................... | H02K 5/128 310/52 |
| 2010/0180854 | A1 * | 7/2010 | Baumann ................ | B04B 5/005 123/196 R |
| 2011/0011795 | A1 | 1/2011 | Hoff | |
| 2011/0180052 | A1 * | 7/2011 | Schwandt ............ | F01M 13/022 123/573 |
| 2012/0174537 | A1 * | 7/2012 | Tornblom ................. | B04B 9/02 55/406 |
| 2012/0174538 | A1 | 7/2012 | Tornblom et al. | |
| 2012/0174547 | A1 * | 7/2012 | Tornblom .............. | F01M 13/04 55/461 |
| 2014/0069398 | A1 * | 3/2014 | Roelver ................. | F02M 25/06 123/572 |
| 2014/0237961 | A1 * | 8/2014 | Szepessy ............... | F01M 13/04 55/385.1 |
| 2015/0068172 | A1 * | 3/2015 | Andersson Aginger ..................... | B01D 45/14 55/385.3 |
| 2015/0119226 | A1 * | 4/2015 | Pogen ........................ | B04B 9/06 494/84 |
| 2017/0036220 | A1 * | 2/2017 | Eliasson ................... | B04B 5/08 |
| 2017/0072409 | A1 * | 3/2017 | Pogén ...................... | B04B 11/02 |
| 2017/0296956 | A1 * | 10/2017 | Ishida ........................ | B04B 7/04 |
| 2017/0348705 | A1 * | 12/2017 | Pogén ...................... | B04B 5/005 |
| 2018/0029045 | A1 | 2/2018 | Ishida | |
| 2019/0283043 | A1 * | 9/2019 | Örtegren ................... | B04B 5/12 |
| 2024/0149278 | A1 * | 5/2024 | Örtegren ................. | B04B 11/02 |

FOREIGN PATENT DOCUMENTS

| | | | |
|---|---|---|---|
| DE | 20 2018 103 711 | U1 | 11/2019 |
| WO | WO 2006/132577 | A1 | 12/2006 |
| WO | WO 2020/120359 | A1 | 6/2020 |

OTHER PUBLICATIONS

International Search Report, issued in PCT/EP2022/054034, dated Jun. 7, 2022.

Written Opinion of the International Searching Authority, issued in PCT/EP2022/054034, dated Jun. 7, 2022.

* cited by examiner

MODULAR CENTRIFUGAL SEPARATOR FOR CLEANING GAS

FIELD OF THE INVENTION

The present invention relates to the field of centrifugal separators for cleaning a gas containing liquid contaminants. In particular, the present invention relates to centrifugal separators cleaning crankcase gases of a combustion engine from oil particles.

BACKGROUND OF THE INVENTION

It is well known that a mixture of fluids having different densities may be separated from one another through use of a centrifugal separator. One specific use of such a separator is in the separation of oil from gas vented from a crankcase forming part of an internal combustion engine.

Regarding this specific use of separators, there can be a tendency for the high-pressure gas found in the combustion chambers of an internal combustion engine to leak past the associated piston rings and into the crankcase of the engine. This continuous leaking of gas into the crankcase can lead to an undesirable increase of pressure within the crankcase and, as a consequence, to a need to vent gas from the casing. Such gas vented from the crankcase typically carries a quantity of engine oil (as droplets or a fine mist), which is picked up from the reservoir of oil held in the crankcase.

In order to allow vented gas to be introduced into the inlet system without also introducing unwanted oil (particularly into a turbocharging system wherein the efficiency of the compressor can be adversely affected by the presence of oil), it is necessary to clean the vented gas (i.e. to remove the oil carried by the gas) prior to the gas being introduced into the inlet system. This cleaning process may be undertaken by a centrifugal separator, which is mounted on or adjacent the crankcase and which directs cleaned gas to the inlet system and directs separated oil back to the crankcase. An example of such a separator is disclosed e.g. in U.S. Pat. No. 8,657,908. Such separators usually comprise a number of separation discs, e.g. arranged in a stack or as axially extending surface plates, and the separation of oil from the gas takes place between such discs, in which oil being collected on the disc is thrown radially outwards to a surrounding wall.

However, different engines may require different mounting arrangements of the centrifugal separator, which thus requires different design of the whole separator. In other words, the centrifugal separator may have to be individually adapted for each type of engine, which increases production time and complexity of the device.

There is thus a need in the art for improved solutions for adapting a centrifugal separator for cleaning gas to different types of engines.

SUMMARY OF THE INVENTION

It is an object of the invention to at least partly overcome one or more limitations of the prior art. In particular, it is an object to provide a centrifugal separator having increased abilities for adapting the device to different engine types.

As a first aspect of the invention, there is provided a centrifugal separator for cleaning gas containing contaminants comprising

- a stationary casing module comprising a surrounding side wall enclosing a separation space through which a gas flow is permitted and further comprising a gas outlet for cleaned gas and at least one drainage opening for draining separated liquid contaminants from a lower portion of the stationary casing module;
- a rotating module comprising a plurality of separation members arranged in said separation space and being arranged to rotate around an axis (X) of rotation,
- a drive member arranged for rotating the rotating module around the axis of rotation (X);
- an inlet module arranged axially above said stationary casing module; comprising an inlet pipe for supply of the gas to be cleaned to said inlet module; and wherein the inlet module is in fluid contact with said separation space;
- a liquid outlet module arranged axially below said stationary casing module and configured to permit discharge of liquid contaminants drained from said stationary casing module;
- wherein the liquid outlet module comprises a lower base portion and at least one upwardly extending portion from said lower base portion; wherein said at least one upwardly extending portion extends axially along the surrounding side wall of the stationary casing module such that the liquid outlet module forms an open container into which the stationary casing module is arranged;
- and wherein the liquid outlet module is attached to said stationary casing module (10) via said at least one upwardly extending portion.

As used herein, the term "axially" denotes a direction which is parallel to the rotational axis (X). Accordingly, relative terms such as "above", "upper", "top", "below", "lower", and "bottom" refer to relative positions along the rotational axis (X). Correspondingly, the term "radially" denotes a direction extending radially from the rotational axis (X). A "radially inner position" thus refers to a position closer to the rotational axis (X) compared to "a radially outer position".

The contaminants in the gas may comprise liquid contaminants, such as oil, and soot.

Consequently, the centrifugal separator may be for separating liquid contaminants, such as oil, from gas. The gas may be crankcase gas of a combustion engine. However, the centrifugal separator may also be suitable for cleaning gases from other sources, for instance the environment of machine tools which frequently contains large amounts of liquid contaminants in the form of oil droplets or oil mist.

The present invention is based on the insight that having a lower liquid outlet module with one or a number of extending portions so that the module forms an open container has a number of advantages. It allows for attaching the liquid outlet module to the stationary casing module at an upper axial position that is more favourable than attaching to just the bottom of the stationary casing module. Thus, the liquid outlet module is arranged so that it also radially supports the stationary casing module. Consequently, the at least one upwardly extending portion may be arranged to from a radial support for the stationary housing module. Such a tight connection provides for using a single seal, such as a single O-ring, for sealing between the stationary casing module and the liquid outlet module.

Further, the at least one upwardly extending portion of the liquid outlet module may be used for attaching the centrifugal separator to an engine. This thus gives the advantage in providing for a number of different axial attachment possibilities, i.e. the possibility to adapt and attach the centrifugal separator tow a variety of engine or engine blocks and to different positions on such engines or engine blocks.

The inlet module, the stationary casing module and the liquid outlet module may be modules that are held together even when not attached to any other module.

The liquid outlet module forming an open container allows for the stationary casing module to be easily inserted into the container from the open axial side of the liquid outlet module.

The centrifugal separator of the of the first aspect comprises a stationary casing module, a rotating module, an inlet module and a liquid module. A "module" may thus be an arrangement that can be manufactured as a separate unit and then easily be attached to another module as a single piece. Such modular concept thus further increases the adaptivity of the separator, i.e. different types of liquid outlet modules may be combined with different inlet modules etc. to form a variety of separator configurations.

The stationary casing module comprises a surrounding side wall, which may together with a first and second end wall enclose the separation space. The stationary casing may have a cylindrical shape with circular cross-section having a radius R from the axis (X) of rotation to the surrounding side wall. This radius R may be constant at least with respect to a major part of the circumference of the surrounding side wall. The stationary casing may also be slightly conical. The first and second end walls may thus form an upper end wall and a lower end wall of the cylindrical shaped casing.

The drainage opening is arranged in the lower portion of the stationary casing, such as arranged in the second end wall, e.g. at the bottom of the separation space.

Separated liquid impurities is thus drained through such at least one drainage opening down to the liquid outlet module. The drainage opening may be in the form of several spot-shaped through holes in the stationary casing or by a single drainage passage. The drainage opening may also be in an annular collection groove at the inner end wall of the stationary casing.

The gas outlet may be arranged in an upper or lower portion of the stationary casing. The gas outlet may thus comprise a through hole through the casing and may further comprise connection means to conduits or the like for the cleaned gas.

In embodiment of the first aspect, the stationary casing module comprises an upper casing and a lower casing forming said surrounding side wall. As an example, the upper and lower casing may be snap-fitted to each other.

Snap-fitting thus means that the upper and lower casing are fitted together by pushing flexible parts of the upper and lower casing together, thereby interlocking the upper and lower casing. The upper casing may also comprise the upper end wall, and the lower casing may also comprise the lower end wall.

By snap-fitting the stationary casing module together provides for better handling of the centrifugal separator during manufacture, e.g. it facilitates inserting the stationary casing into the liquid outlet module.

In embodiments of the first aspect, the stationary casing module comprises an upper casing and a lower casing forming said surrounding side wall, and the liquid outlet module is attached to said stationary casing module via attachment members that also holds said upper and lower casing together.

The attachment member may for example be a screw member. Consequently, the centrifugal separator may be arranged such that the same attachment member is used for both holding the upper and lower casing together as well as fixing the stationary casing module to the liquid outlet module. Thus, during manufacture, a stationary casing module having e.g. snap-fitted upper and lower casing, may be inserted into the liquid outlet module, and then an attachment member, such as a screw, may be used for both securing the upper and lower casing to each other and for attaching the stationary casing module to the liquid outlet module.

In embodiments of the first aspect, the stationary casing module and said inlet module are of polymeric material and wherein said liquid outlet module is of a metallic material.

The liquid outlet module may be arranged closest to the engine or engine block an may thus need a stiffer and more heat resistant material, whereas the inlet module and the stationary casing module may be of a more light-weighted polymeric material In embodiments of the first aspect, the inlet module and the stationary casing module are be snap-fitted to each other. This also allows for the inlet module and the stationary casing module to be inserted into the liquid outlet module. Further, the inlet module and the stationary casing module may be sealed to each other via a single sealing member, such as a sealing ring, arranged between the upper end wall of the stationary casing and the inlet module.

The rotating module of the centrifugal separator is arranged for being rotated around an axis of rotation (X) by means of the drive member. This axis of rotation may be a vertical axis of rotation In embodiments of the first aspect, the rotating module comprises a central space which is in fluid communication with said inlet module and said separation members, such that gas to be cleaned is led from said inlet module to said central space and then radially outwards through said separation members. Thus, the centrifugal separator may work according to the concurrent flow principle, in which the gas flows in the disc stack from a radial inner part to a radial outer part The separation members of the rotating member are examples of surface-enlarging inserts that promote separation of contaminants from the gas. The separation members may be a stack of separation discs. The separation discs of the stack may be frustoconical.

In embodiments of the first aspect, the separation members are a stack of frustoconical separation discs A frustoconical disc may have a planar portion extending in a plane that is perpendicular to the axis of rotation, and a frustoconical portion that may extend upwards or downwards. The planar portion may be closer to the rotational axis than the frustoconical portion.

However, the discs of the stack may be radial discs, in which substantially the whole disc extends in a plane that is perpendicular to the axis of rotation.

It is also to be understood that the separation members, such as separation discs, not necessarily have to be arranged in a stack. The separation space may for example comprise axial discs, or plates that extend around the axis of rotation. The axial discs or plates may be planar, i.e. extending in planes that are parallel to the axis of rotation. The axial discs or plates may also have a slightly or significantly curved shape, such as an arcuate or spiral shape, as seen in a radial plane.

In embodiments of the first aspect, the drive member comprises a turbine wheel arranged in said liquid outlet module and configured to be rotated by means of an oil jet.

The turbine wheel may be arranged for being rotated by means of an oil jet from the lubrication oil system of the combustion engine or a free jet wheel comprising a blow-back disk. However, the drive member may also be independent of the combustion engine and comprise an electrical motor, a hydraulic motor or a pneumatic motor.

In embodiments of the first aspect, the drive member comprises an electrical motor arranged axially above said inlet module.

The inlet module arranged axially above the stationary casing module is for receiving the gas to be cleaned and for guiding the gas to the separation space in the stationary casing module.

In embodiments of the first aspect, the inlet module comprises a plurality of fixing members arranged for mating with a plurality of receiving members arranged on the stationary casing module for attaching the inlet module to the top of the stationary casing module. Such fixing members and receiving members may be arranged for being snap-fitted to each other. The fixing members may be in the form of axial projections extending from e.g. an outer flange of the inlet module. The receiving members of the stationary casing module may be in the form of openings for receiving the axial projections.

As an example, the fixing members and receiving members are spaced around the axis of rotation (X) such that the inlet module may be attached in different rotational states relative to the stationary casing module by rotating the inlet module relative the stationary casing module round the axis of rotation (X).

The fixing members may be equidistantly spaced around the axis of rotation, such as equidistantly spaced around a circumference of the inlet module. In this way, the adaptivity of the centrifugal separator is enhanced, i.e. the inlet module may be attached to the stationary casing module differently depending on the engine or engine block to which the separator is to be mounted.

As an example, the inlet pipe may extend out from the inlet module in the radial direction.

Thus, by rotating the inlet module in relation to the stationary casing module and attaching the inlet module via the fixing and receiving members, the angle between the inlet pipe of the inlet module and the gas outlet of the stationary casing may be adjusted. This is advantageous in that it allows for adapting the centrifugal separator to different engines or engine blocks.

The liquid outlet module is for releasing separated liquid impurities to the outside of the centrifugal separator. The liquid outlet module may thus have a liquid outlet pipe.

Further, the liquid outlet module comprises upwardly extending portions of the liquid outlet module that extends axially along the surrounding side wall of the stationary casing module. As an example, the upwardly extending portions may extend to above 25% of the axial length of the surrounding side wall, such as about half of the axial length of the surrounding side wall of the stationary casing module.

As example, the stationary casing module may comprise an upper and lower casing forming the surrounding side wall, and the at least one upwardly extending portion may axially extend approximately to the interface between the upper and lower casing.

The liquid outlet module comprises a lower base portion which is substantially arranged axially below the stationary casing module, and at least one upwardly extending portion that extends up along the sides of the stationary casing module.

In embodiments of the first aspect, the at least one upwardly extending portion comprises at least two separate axial arm portions, such as at least four separate axial arm portions.

The at least two separate arm portions may be linked to each other, such as linked via an annular rim in the upper portion of the upwardly extending portions. The at least one upwardly extending portion may also comprise openings for receiving fastening means, such as a screw member, for fastening the liquid outlet module to the stationary casing module. Such an opening may be arranged on a brim extending radially from an axial arm portion.

However, the at least one upwardly extending portion may be a single portion such that the liquid outlet module has the shape of a solid walled container into which the stationary casing module is inserted.

In embodiments of the first aspect, the liquid outlet module comprises attachment means to an engine or engine block, and wherein said attachment means are arranged on said at least one upwardly extending portion.

The attachment means may be through holes for receiving fastening means such as a screw member. The through holes may be arranged in an axial portion or in a radial portion of the upwardly extending portion.

However, the liquid outlet module may as an alternative or complement comprise attachment means to an engine or engine block that are positioned in the lower base portion of the liquid outlet module.

In embodiments of the first aspect, the stationary casing module is sealed against the liquid outlet module via a sealing member arranged between the lower base portion and the stationary casing module.

The sealing member may be arranged on an annular sealing surface of the lower base portion. The sealing member may be single sealing member, such as a single sealing ring. Thus, the stationary casing module may be sealed against the liquid outlet module via a single sealing member arranged between the lower base portion and the stationary casing module.

As a second aspect of the invention, there is provided a method for manufacturing a centrifugal separator according to the first aspect, comprising the steps of

- fastening the inlet module to the stationary casing module,
- arranging the rotating module within the stationary casing module and coupling the rotating module to the drive member,
- inserting the stationary casing module into the open container formed by the liquid outlet module,
- attaching the stationary casing module to the liquid outlet module via at least one upwardly extending portion.

The method may further comprise the step of snap-fitting an upper casing to a lower casing of the stationary casing module before inserting the stationary casing module into the open container formed by the liquid outlet module.

As a third aspect of the invention, there is provided a method for cleaning gas containing contaminants comprising

- guiding gas containing contaminants to a centrifugal separator according to the first aspect above during rotation of the rotating module,
- discharging cleaned gas from the gas outlet, and
- discharging liquid contaminants from the liquid outlet module.

The contaminants in the gas may comprise liquid contaminants, such as oil, and soot.

This aspect may generally present the same or corresponding advantages as the former aspects. Effects and features of the second and third aspect are largely analogous to those described above in connection with the first aspect.

Embodiments mentioned in relation to the first aspect are largely compatible with the second and third aspects.

BRIEF DESCRIPTION OF THE DRAWINGS

The above, as well as additional objects, features and advantages of the present inventive concept, will be better understood through the following illustrative and non-limiting detailed description, with reference to the appended drawings. In the drawings like reference numerals will be used for like elements unless stated otherwise.

DETAILED DESCRIPTION

The centrifugal separator according to the present disclosure will be further illustrated by the following description with reference to the accompanying drawings.

Figure 1:
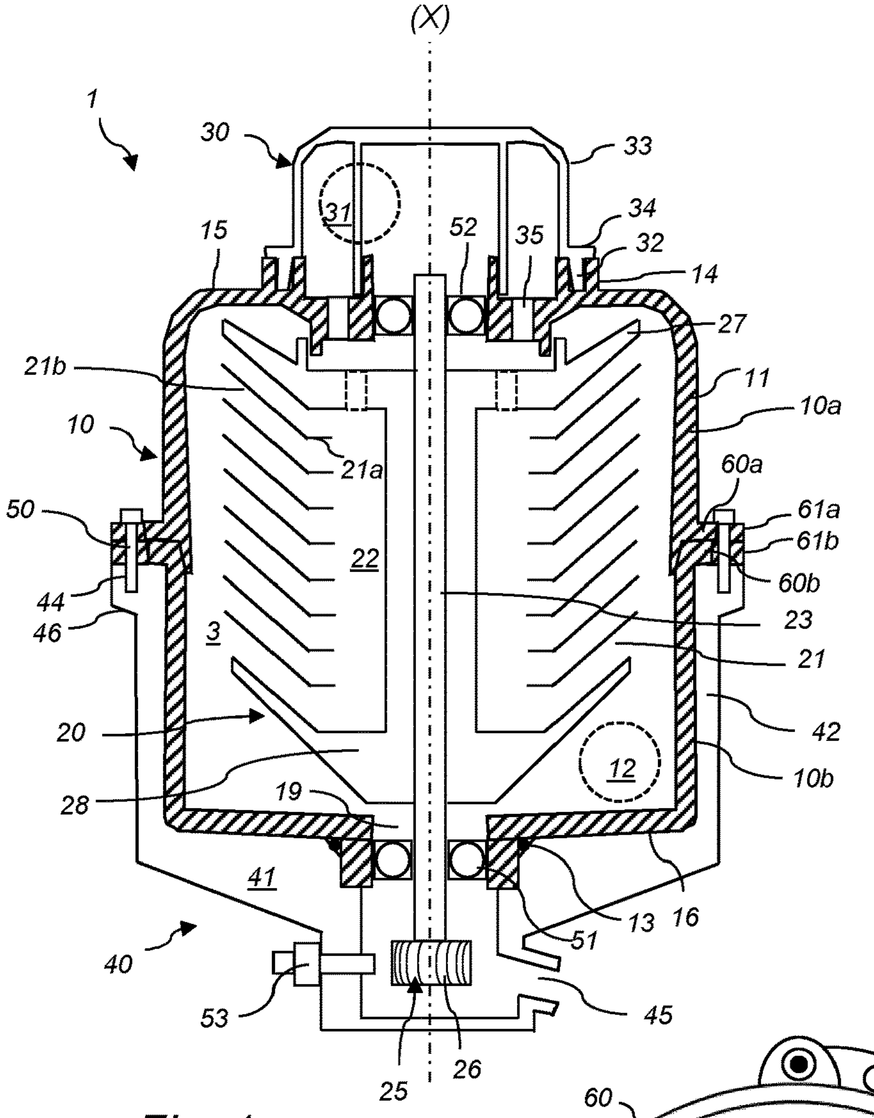
FIG. 1 shows a schematic drawing of a cross-section of a centrifugal separator for cleaning gas.

FIG. 1 shows a section of a centrifugal separator 1 according to the present disclosure. The centrifugal separator 1 comprises a stationary casing module 10, a rotating module 20, an inlet module 30 as well as a liquid outlet module 40.

The centrifugal separator 1 is configured to be mounted to a combustion engine (not disclosed), especially a diesel engine, at a suitable position, such as on top of the combustion engine or at the side of the combustion engine.

It is to be noted that the centrifugal separator 1 is also suitable for cleaning gases from other sources than combustion engines, for instance the environment of machine tools which frequently contains large amounts of liquid contaminants in the form of oil droplets or oil mist.

The stationary casing module 10 encloses a separation space 3 through which a gas flow is permitted. The stationary casing module comprises, or is formed by, a surrounding side wall 11, an upper end wall 15 and a lower end wall 16.

The stationary casing module 10 has a radius from the axis (X) of rotation to the surrounding side wall 11 that is constant at least with respect to a major part of the circumference of the surrounding side wall 11. The surrounding side wall 11 thus has a circular, or substantially, circular cross-section.

It should be noted that the stationary casing module 10 is stationary in relation to the rotating module 20, and preferably in relation to the combustion engine to which it may be mounted.

The gas outlet 12 for cleaned gas is arranged in the surrounding side wall 11 of the stationary casing module 10. The gas outlet 12 is in the form of a gas conduit extending through the surrounding side wall 11. The gas conduit 12 extends in the radially in a direction that is perpendicular to the shown cross-section of FIG. 1, as illustrated by the dotted circle. Moreover, the drainage opening 19 for draining separated liquid contaminants to the liquid outlet module 40 is arranged centrally in the lower end wall 16, such that the liquid is drained through the lower bearing 51, thereby also providing for lubrication of the lower bearing 51.

The rotating module 20 is arranged to rotate around an axis (X) of rotation. The rotating module 20 comprises a spindle 23 and a stack of separation discs 21 attached to the spindle 23. All the separation discs of the stack 21 are provided between a top disc 27 and a lower end plate 28.

The separation discs of the disc stack 21 are frusto-conical and extend outwardly and upwardly from the spindle 23. The separation discs thus comprise a flat portion 21*a*, which extend perpendicularly to the axis of rotation (X), and a conical portion 21*b*, that extend outwardly and downwardly from the flat portion 21*a*.

It should be noted that the separation discs also could extend outwardly and upwardly, or even radially.

The separation discs of the stack 21 are provided at a distance from each other by means of distance members (not disclosed) in order to form interspaces between adjacent separation discs 21, i.e. an interspace between each pair of adjacent separation discs 12. The axial thickness of each interspace may e.g. be in the order of 1-2 mm.

The separation discs of the stack 21 may be made of plastic or metal. The number of separation discs in the stack 21 is normally higher than indicated in FIG. 1 and may be for instance 50 to 100 separation discs 21 depending of the size of the centrifugal separator.

The spindle 23, and thus the rotating module 20, is rotatably supported in the stationary casing module 10 by means of an upper bearing 52 and a lower bearing 51, the bearings being arranged one on each side of the stack of separation discs 21.

Gas to be cleaned is introduced to the separation space via the inlet module 30. For this purpose, the inlet module 30 has an inlet conduit 31 that extends in the radial direction from an inlet casing 33. The inlet conduit 31 is arranged for permitting the supply of crankcase gas from the crankcase to the inlet module 30. In the embodiment shown in FIG. 1, the inlet conduit 31 extends radially in a direction that is perpendicular to the cross-section, as illustrated by the dotted ring 31. The inlet module 30 forms a cover that is attached to the upper end wall 15 of the stationary casing module 1. In this example, the inlet module 30 is attached to the upper end wall 15 via fixing members 32 that are positioned on a lower brim 34 of the inlet casing 33

Gas to be cleaned that enters the inlet conduit 31 is guided via annular through holes 35 arranged radially outside the upper bearing 52. These through holes 35 communicate with the central space 22 such that the gas may be guided radially outwards in the separation space 3 from a central space 22 through the interspaces between the separation discs 21.

The central space 22 is in this example formed at least partly by a through hole in each of the separation discs 21. In the embodiments of FIG. 1, the central space 22 is formed by a plurality of through holes, each extending through the top disc 27 and through each of the separation discs 21, but not through the lower end plate 28. The through holes are arranged in the flat portions 9*a* of the separation discs.

The drive member 25 comprises a turbine wheel 26 arranged in the liquid outlet module 40. This turbine wheel 26 is configured to be rotated by means of an oil jet from oil nozzle 53 arranged for being connected to an engine oil circuit of an internal combustion engine. During running of the internal combustion engine, oil is pumped through the oil nozzle 53 onto turbine wheel 26 connected to the spindle 23 to thereby rotate the rotating member 20 and thus the stack of separation discs 21. As an alternative, the turbine wheel 26 may be arranged to be driven by exhaust gases from the internal combustion engine to rotate the rotating member 20.

As an alternative, the centrifugal separator 1 may comprise an electric motor arranged to rotate the spindle 8 and rotating member 7. The rotating member 7 may also be arranged for being rotated by a mechanical drive unit. Thus, the centrifugal separator may comprise a mechanical drive unit for rotating the rotating member.

The centrifugal separator 1 further comprises a liquid outlet module 40 that is arranged axially below the stationary casing module 10. The liquid outlet module 40 is configured to permit discharge of liquid contaminants drained from the stationary casing 10 via the drainage opening 19. Separated liquid contaminants drained to the liquid outlet module 40, together with oil from the oil nozzle 53 used to drive the wheel 26, may be led back to the engine oil circuit of an internal combustion engine via the liquid outlet conduit 45.

The liquid outlet module 40 comprises a lower base portion 41 and in this example four upwardly extending arms 41, which extend axially upwards from the base portion 41 along the surrounding side wall 11 of the stationary casing module 10. In this way, the liquid outlet module 40 forms an open container into which the stationary casing module 10 is arranged. In FIG. 1, only two of the upwardly extending arms 42 are visible in the cross-section.

Figure 2:
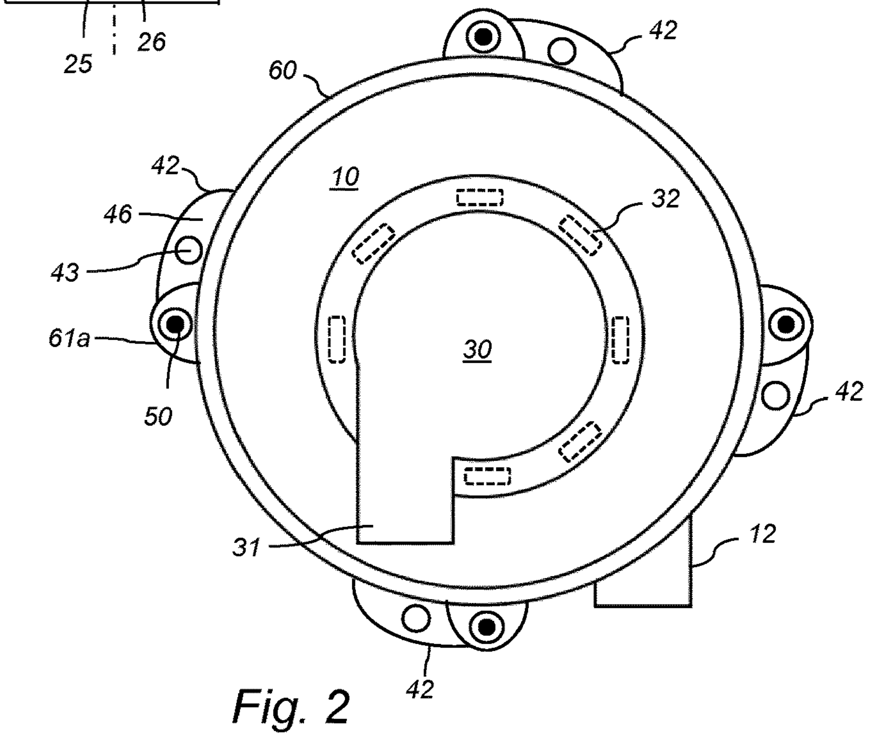
FIG. 2 shows a top view of the centrifugal separator of FIG. 1.

Further, the liquid outlet module 40 is attached to the stationary casing module via the upwardly extending arms 42. This is realized by each arm 42 having an upper flange portion 46 with a receiving opening 44. A screw member 50 is used to attach the liquid outlet module 40 to the stationary casing module 10 via these receiving openings 44. As illustrated in FIG. 1 and FIG. 2, the upper 10*a* and lower 10*b* casing of the stationary liquid module 10 comprises an outer brims 60*a* and 60*b* with radially extending attachment flanges 61*a* and 61*b*. The upper 10*a* and lower 10*b* casings abut each other via these outer radial brims 60*a* and 60*b*. Further, the upper 10*a* and lower 10*b* casings are aligned so that a through opening in the flange 61*a* of the upper casing 10*a* is aligned with a through opening in the flange 61*b* of the lower casing. Moreover, the stationary casing module 10 is aligned in the liquid outlet module 40 so that the receiving openings 44 of the arm portions 42 are aligned with the through openings of the flanges 61*a* and 61*b*. Thus, a screw member 50 inserted via the through openings of the flanges 61*a* and 61*b* may also reach the receiving openings 44, such that the screw member may be used to both attach the upper 10*a* and lower 10*b* casings to each other as well as securing the stationary casing module 10 to the liquid outlet module 40.

Consequently, the liquid outlet module 40 is attached to the stationary casing module 10 via attachment members 50 that also holds the upper 10*a* and lower 10*b* casing together.

Securing the liquid outlet module via the upwardly extending arms 42 also provides for a simple sealing ring 13 arranged between the lower base portion 41 and the stationary casing module 10 for sealing between the liquid outlet module 40 and the stationary casing module 10.

During operation of the centrifugal separator as shown in FIG. 1, the rotating module 20 is kept in rotation by the oil nozzle 53 supplying oil against the wheel 26. As an example, the rotational speed may be in the range of 7.500-12.000 rpm.

Contaminated gas, e.g. crankcase gas from the crankcase of an internal combustion engine, is supplied to the inlet module 30 via conduit 31. This gas is conducted further into the central space 22 and from there into and through the interspaces between the separation discs of the stack 21. As a consequence of the rotation of the rotating module 20 the gas is brought to rotate, whereby it is pumped further on radially outwardly through gaps or interspaces between the separation discs.

Thus, the crankcase gases are "pumped" from the central portion 22 of the rotating module 20 into the interspaces between the separation discs 21 by the rotation of the rotating module 20. Thus, the centrifugal separator works according to the concurrent flow principle, in which the gas flows in the disc stack from a radial inner part to a radial outer part, which is opposite to a separator operating according to the counter-current flow principle, in which the gas is conducted into the centrifugal rotor at the periphery of the rotor and is led towards a central part of the rotor.

During the rotation of the gas in the interspaces, solid or liquid particles such as oil suspended in the gas are separated therefrom. The particles settle on the insides of the conical portions 21*b* of the separation discs and slide or run after that radially outwardly thereon. When the particles and/or liquid drops have reached out to the radial outer edges of the separation discs 21, they are thrown away to hit the inner surface of the surrounding side wall 11. From there, oil may be pulled by gravity downwardly to bottom end wall 16 and leave the separation space 3 through the drainage outlet 19.

Cleaned gas freed from particles and exiting from the stack of separation discs 21 leaves the stationary casing module 10 through the gas outlet conduit 12.

FIG. 2 shows an upper view of the centrifugal separator discussed in relation to FIG. 1. As discussed above, the liquid outlet module 40 has four upwardly extending arms 42, equidistantly arranged around the stationary casing module 10. The upper brims 46 on the arm portions 42 further comprises attachment means 43, such that the centrifugal separator 1 may be attached to an engine or an engine block.

Figure 3:
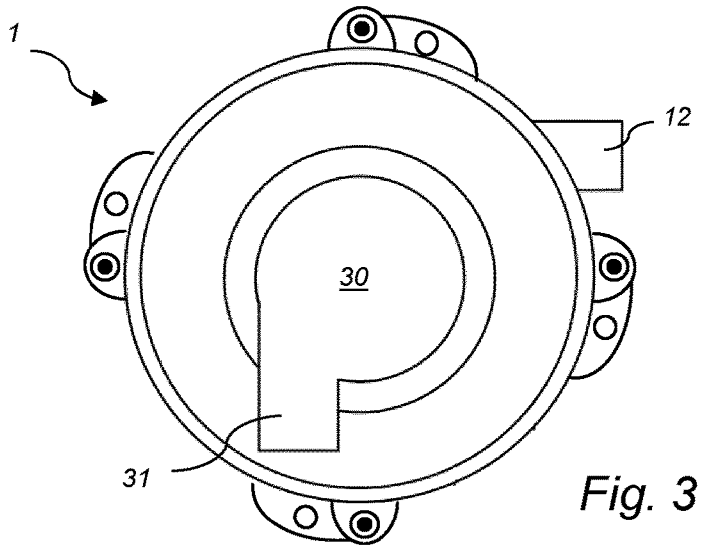
FIG. 3 shows a top view of the centrifugal separator of FIG. 1 in which the inlet module has been rotated in relation to the stationary casing module.

Further, the inlet module comprises a plurality of fixing members 32 arranged for mating with the plurality of receiving members 14 arranged on the stationary casing module 10 for attaching the inlet module 30 to the top of the stationary casing module 10. As illustrated in FIG. 2, the fixing members 32 and receiving members are spaced around the axis of rotation (X) such that the inlet module 30 may be attached in different rotational states relative to the stationary casing module 10 by rotating the inlet module 30 relative the stationary casing module 10 around the axis of rotation (X). In FIG. 2, the inlet module 30 is attached to the stationary casing module 10 such that the inlet conduit 31 and the gas outlet conduit 12 both point in the same direction. The plurality of fixing members 32 makes it possible to rotate the inlet module 30 in relation to the stationary casing module 10 if there is a need for the gas inlet conduit 31 to be arranged in a direction forming an angle with the gas outlet conduit 12. This may depend on the type of engine to which the centrifugal separator 1 is to be attached. An example is illustrated in FIG. 3, in which the inlet module 30 has been rotated 90 degrees relative the stationary casing module 10 so that the gas inlet conduit 31 forms a 90-degree angle with the gas outlet conduit 12.

Figure 4:
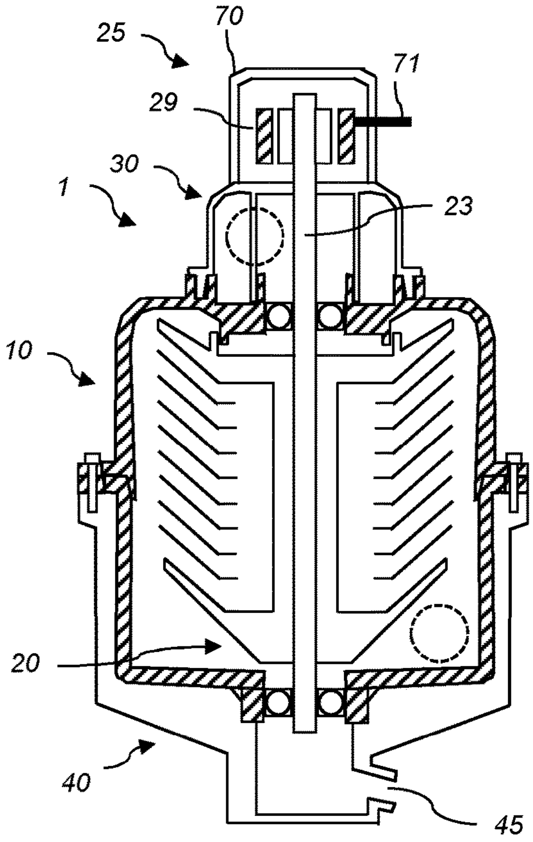
FIG. 4 shows a schematic drawing of a cross-section of a centrifugal separator for cleaning gas having an electrical motor as drive member.

FIG. 4 shows an embodiment in which the drive member is in the form of an electrical motor 29 arranged axially above the inlet module 30. In this embodiment the spindle 23 extends up through the inlet module 30 into a drive casing 70, in which the electrical motor 29 is arranged. The electrical motor may comprise a stator and a rotor, and the rotor may be directly mounted on the spindle 29 to supply torque to the spindle 23. Further, there may be electrical connections 71 extending through the drive casing 70 for supply of power to the electrical motor. By having the electrical motor 29 arranged axially above the inlet module 30, electrical connections 71 may easily be arranged in any radial direction to the electrical motor 29.

Figure 5:
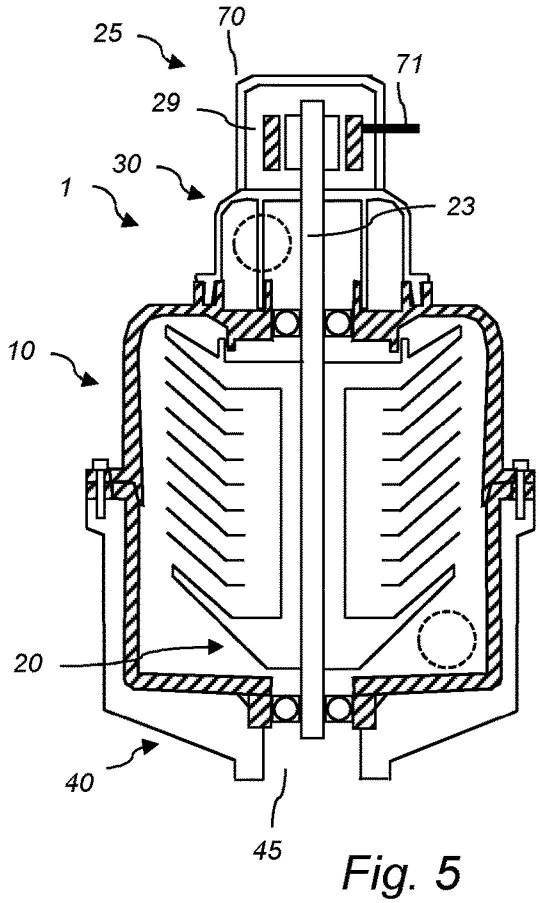
FIG. 5 shows a schematic drawing of a cross-section of a centrifugal separator for cleaning gas having an electrical motor as drive member.

Further, in the embodiments of FIGS. 1-4, the liquid outlet conduit 45 of the liquid outlet module 40 is arranged to discharge separated liquid impurities substantially in the radial direction. However, this liquid outlet conduit may as well be arranged to discharge the separated liquid impurities axially downwards, as illustrated in the embodiment of FIG. 5, which in similarity to the embodiment of FIG. 4 has an electrical motor as a drive member 25.

The modular concept of the present disclosure together provides for a variety of combinations between inlet modules 30 and liquid outlet modules 40 to be used together with a stationary casing module 10. With the design of the liquid outlet module 40, with its least one upwardly extending portion 42, the stationary casing module may easily be fitted into different liquid outlet modules 40 but still provide a good seal between the two. This is further illustrated in FIGS. 6-8.

Figure 7A:
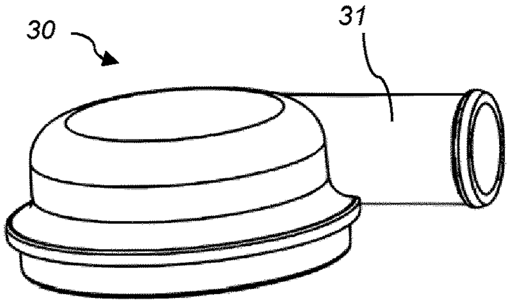
FIGS. 7*a* and 7*b* show different inlet modules that may be attached to the centrifugal separator of FIG. 6.
Figure 7B:
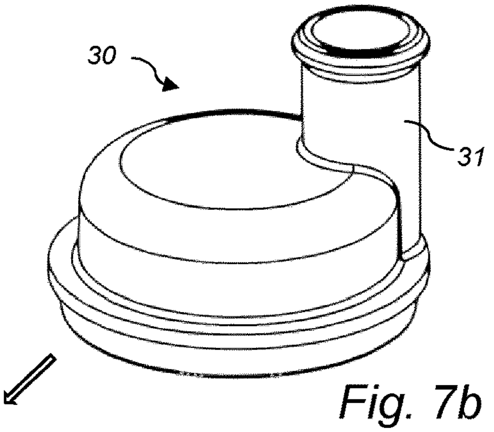
Figure 6:
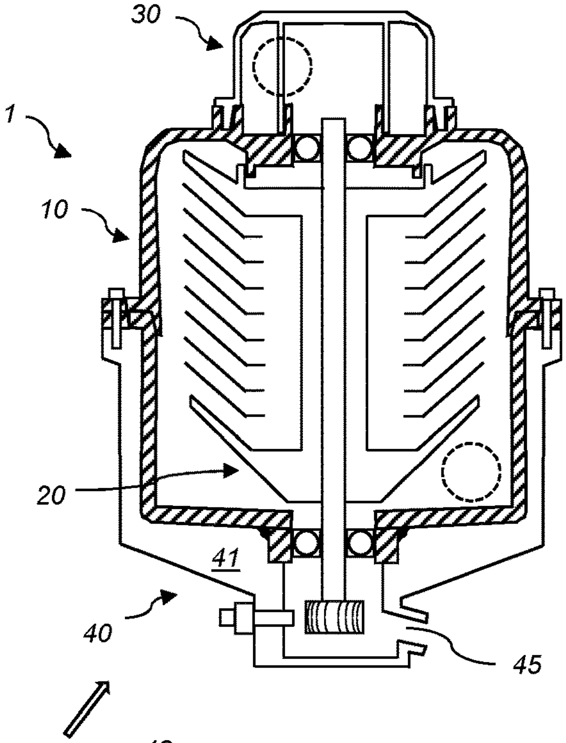
FIG. 6 shows a schematic drawing of a cross-section of a centrifugal separator for cleaning gas.

FIG. 6 basically shows the centrifugal separator of FIG. 1 with its stationary casing module 10, the rotating module 20, the inlet module 30 and the liquid outlet module 40. FIGS. 7*a* and 7*b* show two different variants of an inlet module 30 that may be attached to the stationary casing module 10 of FIG. 6. In FIG. 7*a*, the inlet pipe 31 of the inlet module 30 is arranged radially, whereas in FIG. 7*b*, the inlet pipe 31 of the inlet module 30 is arranged in the axial direction.

Figure 8A:
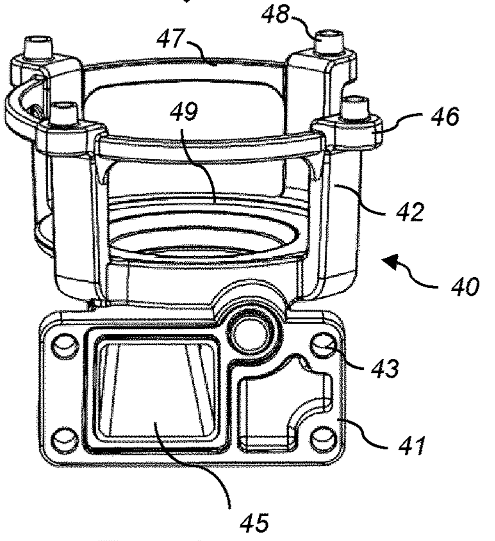
FIGS. 8*a* and 8*b* show different liquid outlet modules that may be attached to the centrifugal separator of FIG. 6.
Figure 8B:
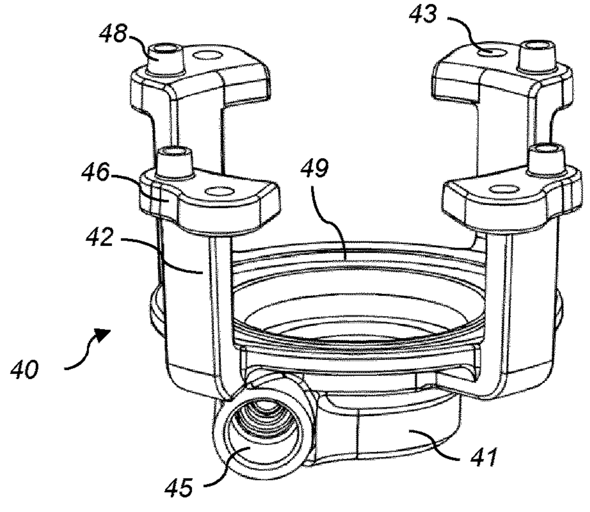

FIGS. 8*a* and 8*b* show two different liquid outlet modules that may be used with the stationary casing module 10 of FIG. 6. The liquid outlet module 40 of FIG. 8*a* is arranged to be attached to an engine block (not shown) and has a large liquid outlet channel or pipe 45 with a substantially rectangular cross-section arranged on the lower base portion 41. The liquid outlet module 40 has four upwardly extending arm portion 42 that are equidistantly spaced around the central axis. Each extending arm portion 42 has an upper flange portion 46. In these flange portions, sleeves 48 are arranged for receiving a fastening means such as a screw, for attachment of the stationary casing module 10 within the liquid outlet module 40, as discussed in relation to FIG. 1 above. For further stability of the liquid outlet module, the upwardly extending arm portions 42 are adjoined with an upper annular rim 47. Further, since the liquid outlet module 40 is arranged for being fitted to an engine block, the attachment means 43 for attaching the liquid outlet module, and thus the whole separator 1, are arranged on the lower base portion. The attachment means 43 is in this case in the form of four through holes 43 arranged in an axial plane.

FIG. 8*b* shows yet another embodiment of a liquid outlet module 40 into which a stationary casing module 10 may be fitted. The liquid outlet module 40 comprises four upwardly extending arms 42 from the base portion 41. These arms 42 are not adjoined with any rim and comprises upper flanges 46 onto which sleeves 48 are arranged. These sleeves may be used for attaching the liquid outlet module 40 to the stationary casing module 10 with e.g. screws, as discussed in relation to FIG. 1 above. Further, in this embodiment, the attachment means 43 to an engine or engine block are arranged on each of the at least one upwardly extending arm portions 42, which also means that the base portion 41 may be thin in the axial direction. The liquid outlet pipe 45 of the base portion 41 is in this case in the form of a pipe with a circular cross-section.

Consequently, by alternating between the liquid outlet module of FIG. 8*a* and the liquid outlet of FIG. 8*b*, the axial position of the centrifugal separator 1 in relation to the engine or engine block may be varied since the upwardly extending portions 42 and the base portion 41 provides for having attachment means 43 at different axial positions.

Further shown in FIGS. 8*a* and 8*b* are an annular sealing surface 49 arranged ion the lower base portion 41. This annular sealing surface is configured for receiving e.g. a single sealing ring for sealing between the stationary casing module and the liquid outlet module 40.

The centrifugal separator 1 of FIGS. 6-8 may be of different materials. As an example, the different modules may be of different materials. The stationary casing module 10 and the inlet modules 30 may be of polymeric material whereas the different liquid outlet modules 40 may of a metallic material.

To simplify mounting of the modular centrifugal separator 1 as disclosed herein, the stationary casing module 10 and the inlet module 30 may be snap-fitted to each other before being inserted into the open container formed by the liquid outlet module 40. This is further illustrated in FIG. 9, in which fixing members 32, which are positioned on a lower brim 34 of the inlet casing 33, are fitted into receiving members 14 arranged on the top of the upper casing 10*a* of the stationary casing module 10. The fixing members 32 are flexible so that they may be pressed into the receiving members 14, thereby providing a snap fir between inlet module 30 and stationary casing module. 10. Further, a sealing ring 72 is also used to seal the stationary casing 10 to the inlet module 30, and thus aid in sealing the separation space 3.

Figure 9:
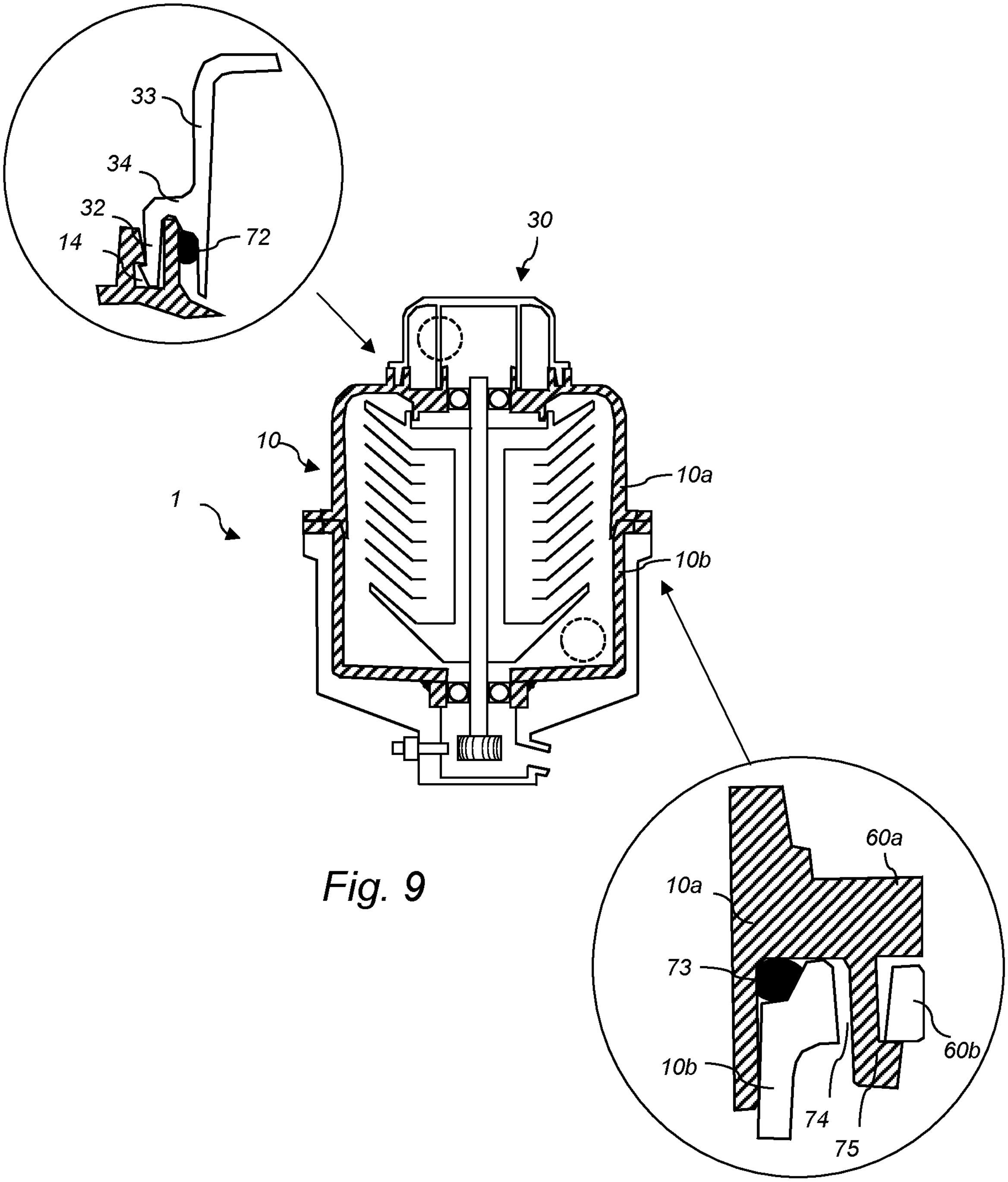
FIG. 9 shows how the inlet module may be snap-fitted to the stationary casing module and how the upper and lower casing of the stationary casing module may be snap-fitted to each other.

FIG. 9 also shows how the stationary casing module may be assembled using a snap-fit between the upper casing 10*a* and the lower casing 10*b*. The upper and lower casings form the surrounding side wall 11 of the stationary casing module 1, and comprises an outer brims 60*a* and 60*b*, respectively. The upper 10*a* and lower 10*b* casings abut each other via these outer radial brims 60*a* and 60*b*. The outer radial brim 60*a* of the upper casing 10*a* comprises a flexible axially extending portion 75, that may be flexed and thereby inserted into the receiving through hole 74 of the outer radial brim 60*b* of the lower casing 10*b*, thereby providing a snap-fit between the upper 10*a* and lower 10*b* casings. Moreover, an annular sealing ring 73 is arranged radially inside the snap-fit between the upper 10*a* and lower 10*b* casing, to further provide a sealed separation space 3.

The invention is not limited to the embodiment disclosed but may be varied and modified within the scope of the claims set out below. In the above the inventive concept has mainly been described with reference to a limited number of examples. However, as is readily appreciated by a person skilled in the art, other examples than the ones disclosed above are equally possible within the scope of the inventive concept, as defined by the appended claims.

The invention claimed is:

1. A centrifugal separator for cleaning gas containing contaminants comprising:

a stationary casing module the stationary casing module comprising:

a surrounding side wall enclosing a separation space through which a gas flow is permitted;

a gas outlet for cleaned gas; and at least one drainage opening for draining separated liquid contaminants from a lower portion of the stationary casing module;

a rotating module comprising a plurality of separation members arranged in said separation space and being arranged to rotate around an axis of rotation;

a drive member arranged for rotating the rotating module around the axis of rotation;

an inlet module arranged axially above said stationary casing module, the inlet module comprising an inlet pipe for supply of gas to be cleaned to said inlet module, wherein the inlet module is in fluid contact with said separation space; and a liquid outlet module arranged axially below said stationary casing module and configured to permit discharge of liquid contaminants drained from said stationary casing module, wherein the liquid outlet module comprises a lower base portion and at least one upwardly extending portion from said lower base portion, wherein said at least one upwardly extending portion extends axially along the surrounding side wall of the stationary casing module such that the liquid outlet module forms an open container into which the stationary casing module is arranged, and wherein the liquid outlet module is attached to said stationary casing module via said at least one upwardly extending portion, wherein the liquid outlet module forms the open container into which the stationary casing module is axially inserted from an open side of the open container, and wherein the liquid outlet module is attached to said stationary casing module via said at least one upwardly extending portion, the upwardly extending portion being positioned radially outward of the surrounding side wall of the stationary casing module in a portion that directly and radially overlap with plurality of separation members of the rotating module.

2. The centrifugal separator according to claim 1, wherein said at least one upwardly extending portion comprises at least two separate arm portions.

3. The centrifugal separator according to claim 1, wherein the liquid outlet module comprises an attachment to an engine or engine block, and wherein said attachment is arranged on said at least one upwardly extending portion.

4. The centrifugal separator according to claim 1, wherein the stationary casing module is sealed against the liquid outlet module via a sealing member arranged between the lower base portion and the stationary casing module.

5. The centrifugal separator according to claim 1, wherein said stationary casing module and said inlet module are of polymeric material and wherein said liquid outlet module is of a metallic material.

6. The centrifugal separator according to claim 5, wherein the inlet module and the stationary casing module are snap-fitted to each other.

7. The centrifugal separator according to claim 1, wherein said stationary casing module comprises an upper casing and a lower casing forming said surrounding side wall, and wherein said upper and lower casing are snap-fitted to each other.

8. The centrifugal separator according to claim 1, wherein said stationary casing module comprises an upper casing and a lower casing forming said surrounding side wall, and wherein the liquid outlet module is attached to said stationary casing module via attachment members that hold said upper and lower casing together.

9. The centrifugal separator according to claim 1, wherein said inlet module comprises a plurality of fixing members arranged for mating with a plurality of receiving members arranged on the stationary casing module for attaching the inlet module to the top of the stationary casing module, and wherein the fixing members and the receiving members are spaced around the axis of rotation such that the inlet module may be attached in different rotational states relative to the stationary casing module by rotating the inlet module relative the stationary casing module around the axis of rotation.

10. The centrifugal separator according to claim 6, wherein said inlet pipe extends out from the inlet module in the radial direction.

11. The centrifugal separator according to claim 1, wherein the drive member comprises a turbine wheel arranged in said liquid outlet module and configured to be rotated by an oil jet.

12. The centrifugal separator according to claim 1, wherein the drive member comprises an electrical motor arranged axially above said inlet module.

13. The centrifugal separator according to claim 1, wherein said rotating module comprises a central space in fluid communication with said inlet module and said separation members, such that gas to be cleaned is led from said inlet module to said central space and then radially outwards through said separation members.

14. The centrifugal separator according to claim 1, wherein said separation members are a stack of frustoconical separation discs.

15. The centrifugal separator according to claim 2, wherein the liquid outlet module comprises an attachment to an engine or engine block, and wherein said attachment is arranged on said at least one upwardly extending portion.

16. The centrifugal separator according to claim 2, wherein the stationary casing module is sealed against the liquid outlet module via a sealing member arranged between the lower base portion and the stationary casing module.

17. The centrifugal separator according to claim 3, wherein the stationary casing module is sealed against the liquid outlet module via a sealing member arranged between the lower base portion and the stationary casing module.

18. The centrifugal separator according to claim 2, wherein said stationary casing module and said inlet module are of polymeric material and wherein said liquid outlet module is of a metallic material.

19. The centrifugal separator according to claim 3, wherein said stationary casing module and said inlet module are of polymeric material and wherein said liquid outlet module is of a metallic material.

* * * * *